United States Patent [19]
Thomas

[11] 4,103,569
[45] Aug. 1, 1978

[54] PROGRAMMING CAM INDEXING MECHANISM

[75] Inventor: Paul W. Thomas, Duxbury, Mass.

[73] Assignee: Polaroid Corporation, Cambridge, Mass.

[21] Appl. No.: 756,381

[22] Filed: Jan. 3, 1977

[51] Int. Cl.[2] ........................ B23B 29/24; B23Q 17/00

[52] U.S. Cl. .................................. 74/816; 74/813 C; 74/813 L

[58] Field of Search ..................... 74/816, 817, 813 C, 74/813 L

[56] References Cited

U.S. PATENT DOCUMENTS

| | | | |
|---|---|---|---|
| 2,937,732 | 5/1960 | Brady | 74/816 X |
| 3,172,099 | 3/1965 | De Puy | 74/816 X |
| 3,541,890 | 11/1970 | Minkenberg | 74/816 |

*Primary Examiner*—Leonard H. Gerin
*Attorney, Agent, or Firm*—Frederick A. Goettel

[57] ABSTRACT

A programming cam indexing mechanism in which a rotatable programming cam, provided with a peripheral traction surface and a concentric inwardly facing track having one or more notches therein to define indexed programming positions, is rotatably driven by a capstan coupled with a drive shaft, the capstan being supported by a latch member pivotal on the drive shaft axis. The latch member is integrally formed to define a follower bracket and tab engageable with the inwardly facing track surface on the programming cam to hold the capstan in engagement with the peripheral traction surface thereof but to allow the capstan to swing away from driving engagement with the traction surface when the follower bracket tab drops into the positioning notches. A spring biasing means is provided by which the follower bracket tab is moved into the notches to latch the programming cam in any one of the indexed positions. Movement out of the notches is effected by solenoid activation.

13 Claims, 4 Drawing Figures

PROGRAMMING CAM INDEXING MECHANISM

BACKGROUND OF THE INVENTION

This invention relates to indexing mechanisms and more particularly, it concerns a novel driving and latching mechanism for indexing multi-position control elements, such as programming cams used in automated equipment for performing any one of several operational cycles in accordance with information provided by an indexed position of such cams.

Various types of automated equipment are often programmed to any one of several operational modes for the performance of selected or sequential functions in accordance with information supplied by a programming device indexible to multiple positions corresponding to the respective modes in which the equipment may be operated. As an example of such equipment, reference is made to cassette contained motion picture film strip handling equipment of the type disclosed in U.S. Pat. No. 3,941,465 issued Mar. 2, 1976 to Irwin E. Figge, et al. Such apparatus is designed to receive a self-contained multi-function film cassette and to be programmed either to project, process exposed but unprocessed film, or merely to condition the apparatus in an off position to receive subsequent film cassettes. The manner in which the various viewer mounted components are operated to function with the film cassette is conveniently determined by a rotatably indexed programming cam to control the operational mode to which the viewer is conditioned.

Because of the several control functions served by the programming cam of such equipment in each of the respective indexed positions thereof, it is important that the cam be positively latched after it is rotated from a previous position. It is also important that the time required for indexing be minimized inasmuch as such indexing time is actually a delay in the operation of the equipment when the program of operation is changed.

The torque necessary to drive a rotatable programming cam between successive indexed positions is desirably provided by a drive motor connected to other operating components in the equipment. The use of such drive motor torque thus requires a facility for coupling and decoupling the drive motor with the logic disc in addition to the latching function mentioned above. In addition, and particularly in the motion picture film strip viewing equipment referred to, in which a programming cam is indexed to three programming positions such as "Off", "Project", and "Process/-Rewind", a facility for rotating the cam past the off position or between project and rewind without changing the direction of cam indexing movement is desirable from the standpoint of a replay capability. Cam indexing mechanisms which have provided this facility in the past have been complicated, expensive and of doubtful reliability.

SUMMARY OF THE INVENTION

In accordance with the present invention, a unique programming cam driving and latching arrangement is provided by which driving torque may be supplied from a continuously rotating power source and disconnected simultaneously with latching the cam in an indexed position. The indexing operation is effected by an extremely simple capstan drive carried by a spring latching mechanism engageable in outwardly extending notches relative to an inwardly facing track near the cam periphery. Indexing movement is initiated by pulsing a solenoid or other actuating device to lift a latch tab out of engagement with a track notch and simultaneously engage the cam periphery whereupon the solenoid or other force is released. The latching tab, in riding on the internal track, biases the capstan in engagement with the periphery of the programming cam until the next latching notch is encountered by the latching tab. In the event an indexed programming position is to be bypassed, the actuating solenoid is retained in an energized condition until the latching notch for that position has passed the latch tab.

Accordingly, among the objects of the present invention are: to provide an improved indexing mechanism for programming devices such as angularly indexable programming cams; the provision of such an indexing mechanism which may be coupled to a continuously rotating source of power and actuated for indexing purposes independently of the power source rotation; the provision of such an indexing mechanism which simultaneously releases an indexing drive coupling with a rotatable programming cam simultaneously with latching the programming cam in the indexed position; the provision of such a programming cam indexing mechanism which facilitates indexing movement through one of multiple, positively latched positions; and the provision of such an indexing mechanism which is extremely simple and thus easily manufactured and assembled at low cost.

Other objects and further scope of applicability of the present invention will become apparent from the detailed description to follow taken in conjunction with the accompanying drawings in which like parts are designated by like reference numerals.

DETAILED DESCRIPTION OF THE PREFERRED EMBODIMENT

Figure 1:
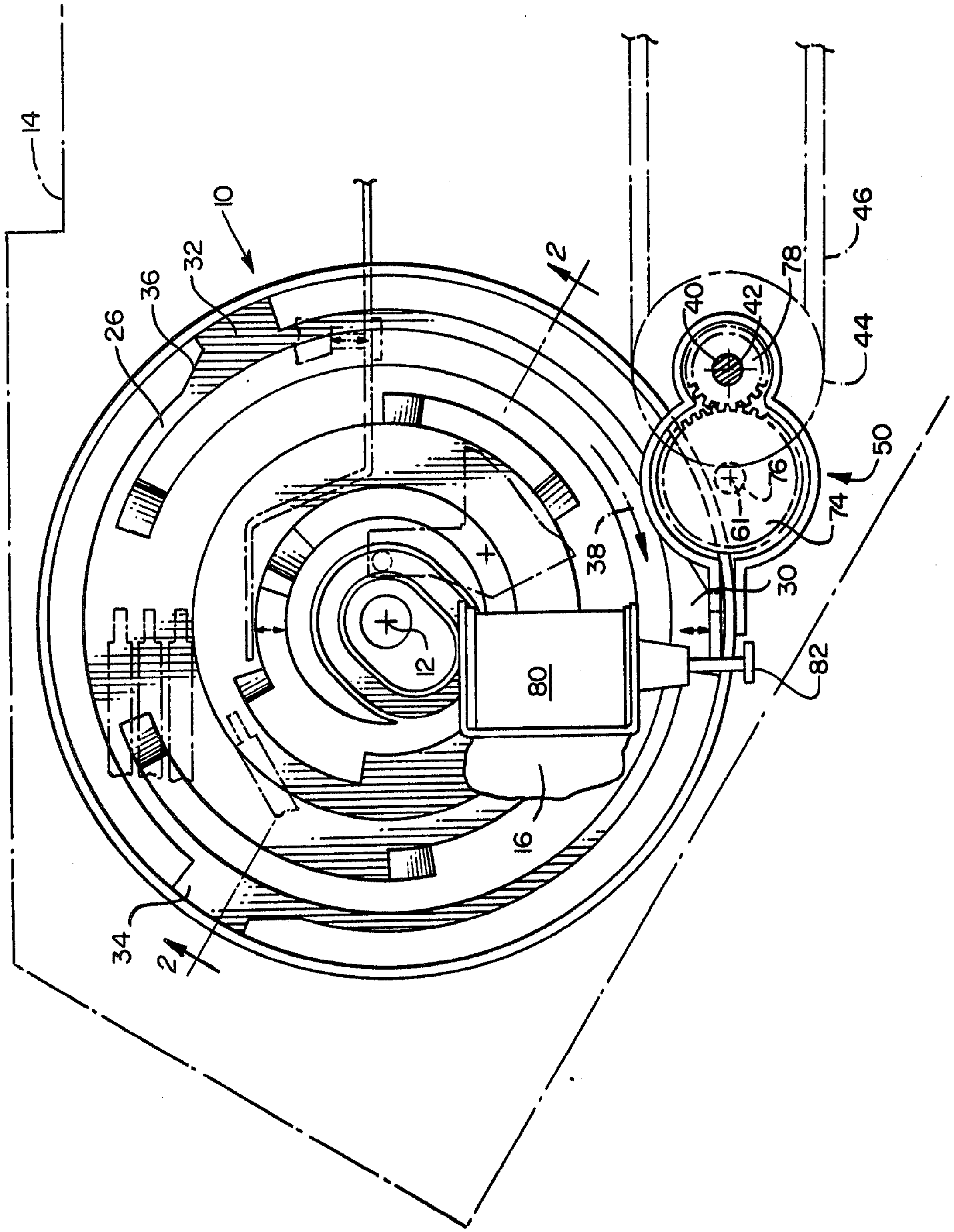
FIG. 1 is a side elevation of a rotatable programming cam disc equipped with the indexing mechanism of the present invention.
Figure 2:
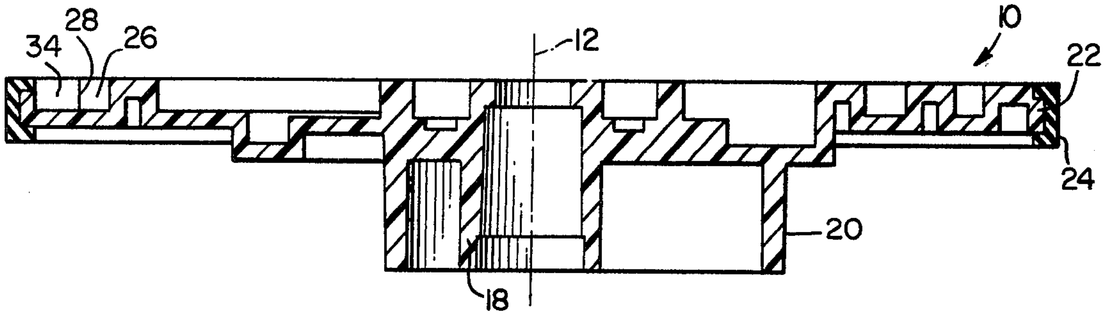
FIG. 2 is a cross-section of the programming cam disc an line 2—2 of FIG. 1.

In FIGS. 1 and 2 of the drawings, an exemplary embodiment of a programming cam disc is generally designated by the reference numeral 10. In the interest of clarity, operating components of the equipment in which the illustrated cam disc is expressly intended for use are omitted from the drawings. It will be noted however, that the disc 10 is supported rotatably on an axis 12 by a chassis structure 14 having a supporting web or wall 16 capable of supporting an axle (not shown) to extend through a central hub 18 concentric with the axis 12. Various equipment related controls operated in response to indexed positioning of the cam disc 10 are depicted in phantom lines in FIG. 1. These elements may include switches or linkages actuated by appropriately formed radial cams on the one side of the cam disc illustrated in FIG. 1 but may include additionally a peripheral cam surface 20, for example on the opposite side as shown in FIG. 2. Such components as well as the specific configuration of the cam tracks will not be described inasmuch as it will be readily apparent to one skilled in the art that such control components will be adjustably positioned in response to rotatable indexing of the cam 10 relative to control components supported by the chassis structure 14.

The cam disc 10 is preferrably formed as an integral molding of an appropriate synthetic resinous material establishing the hub 18 as well as the several programming cam surfaces on one or the other faces thereof. A circular peripheral rib or flange 22 is formed in the disc to support a rim or tire 24 of a pliant friction material such as urethane, neopreme or the like. Inwardly of the flange 22, the side of the disc 10 shown in FIG. 1 of the drawings is provided with a circular track 26 of uniform depth in a direction parallel to the axis 12 to establish an inwardly facing axial track surface 28. The track 28 is interrupted in three places by tactile discontinuities in the form of notches 30, 32 and 34, each having an inclined ramp 36 on the side thereof following the respective notches as they undergo movement in a clockwise direction as depicted by the arrow 38. The notches 30, 32 and 34 in the disclosed embodiment are spaced approximately 120° from each other and represent indexed positions in which the cam disc may be latched after rotation thereof about the axis 12 in a manner to be described in more detail below.

Although not completely shown in the drawings, the equipment incorporating the cam disc 10, in this instance a viewing apparatus by which a cassette contained motion picture film strip may be processed, viewed by projection and rewound, is provided with a drive motor (not shown) having an output shaft 40 rotatable on an axis 42. As depicted by FIG. 1, the motor shaft 40 may be coupled by a belt 46 and pulley 44 to such components as a shutter, a film feed shuttle as well as spool drive means, none of which are shown in the drawings because they are irrelevant to the cam disc indexing and latching mechanism of the present invention. It will be understood from this description, however, that the drive motor shaft 40 may be rotated continuously in one direction during operation of the apparatus in which the cam disc 10 is mounted.

Figure 3:
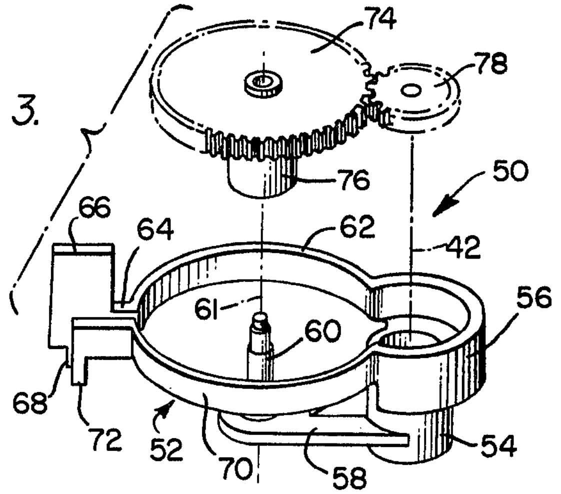
FIG. 3 is an exploded perspective view illustrating the cam indexing mechanism of the present invention.
Figure 4:
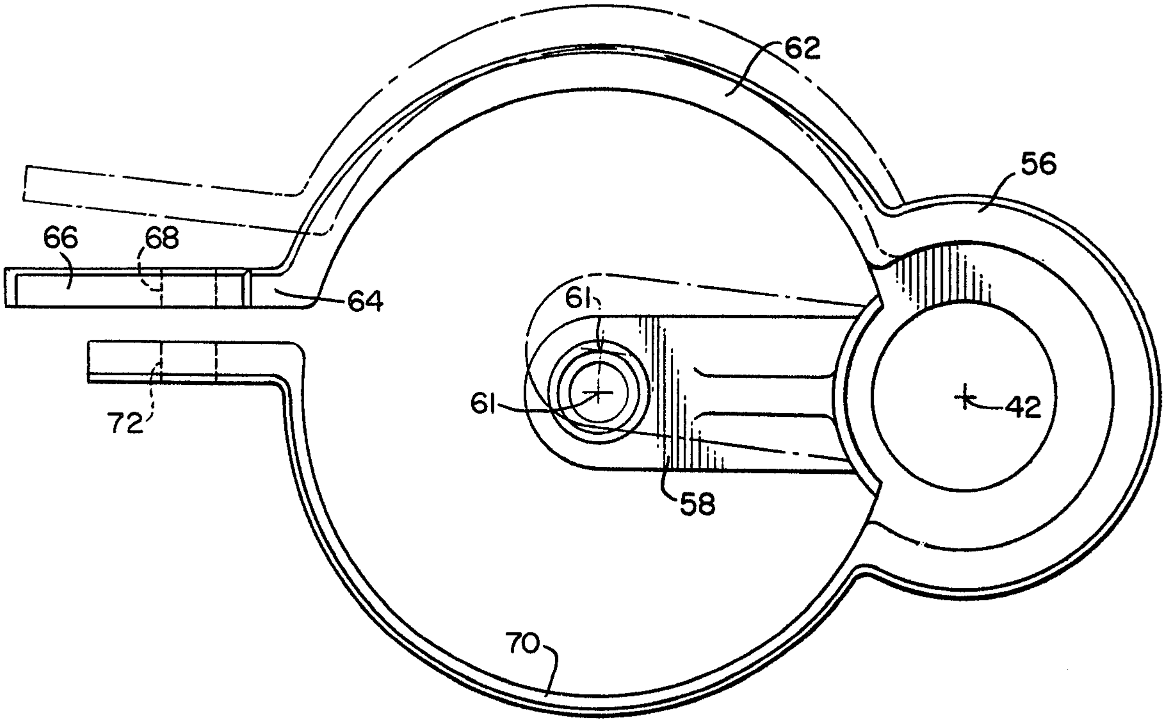
FIG. 4 is an enlarged side elevation illustrating the principle latching component of the present invention.

Rotational indexing movement of the cam disc 10 is effected by a latch assembly generally designated by the reference numeral 50 in FIGS. 1 and 3 of the drawings. In FIG. 3, the individual components of the latch gear assembly 50 are shown most clearly to include an integrally molded latch member 52 shaped having a pivot hub portion 54 extending axially from a pinion gear housing portion 56 and supporting at its extending end, a radial arm portion 58. The radial arm portion 58 in turn supports an integral latch gear axle 60 on axis 61. The gear housing portion 56 joins on one side with an arcuate follower bracket 62 extending radially on the end thereof opposite from the hub portion 54 as a flange 64 having a solenoid lift tab 66 extending one side thereof or outwardly, and a cam follower tab 68 extending in the opposite direction or inwardly. The gear housing portion 56 extends from its opposite side through a similar arcuately shaped spring portion 70 having at its distal end a stop flange and tab formation 72. A latch gear 74 having a friction drive capstan 76 projecting concentrically therefrom is journaled on the axle 60 in a position to mesh with a drive pinion 78 disposed concentrically in the housing portion 56.

In FIG. 1, the latch assembly 50 is shown in its mounted position relative to the programming cam disc 10. As such, the pinion gear 78 is keyed or otherwise fixed for rotation on the motor or drive shaft 40 and on the axis 42. Also, the latch member 52 is freely pivoted by the hub portion 54 on the motor shaft axis 42. An actuating solenoid 80 is supported from the chassis wall portion 16 such that a plunger foot 82 thereon underlies the tab 66 integrally formed on the end of the arcuate bracket portion 62. It will be noted that the tab 72 underlies the peripheral flange and tire 24 so that the elasticity of the arcuate spring 70 will exert a bias on the cam follower or latch tab 68, urging it against the axial track surface 28 as well as into the notches 30, 32 and 34. In this condition, it will be noted further that the capstan 76 (FIG. 1) is spaced from the tire 24 of the programming cam disc 10.

In light of the structural organization thus described, and assuming the motor shaft 40 is rotating in a clockwise direction to drive the pinion gear in a clockwise direction and the latch gear 74 is a counter-clockwise direction, no rotation of the cam disc 10 will occur because the capstan 76 is spaced from the tire 24 and also because the latch tab 68 is engaged in one of the notches 30, 32 and 34. If however, the solenoid 80 is momentarily energized such that the plunger foot 82 thereon lifts the tab 66 to pivot the latch member 52 about the axis 42, both the latch tab 68 will be removed from the latching notch and the capstan 76 will be moved into engagement with the tire 24. As soon as the follower tab 68 engages a ramp 36, the solenoid may be de-energized without disengagement of the capstan 76 with the tire 24 as a result of the follower 68 being positioned by the axial track 28 to retain the capstan in engagement with the tire. As soon as the follower tab 68 reaches the next indexing notch, however, the follower tab will drop into the latch to again space the capstan 76 from the tire 24. In the event it is desired to pass one of the notches it is necessary only to retain the solenoid 80 in an energized condition or during passage of one of the respective notches 30, 32 or 34 past the follower tab 68 until it is again picked up by the respective ramp surface 36.

Thus it will be seen that as a result of the present invention, an extremely simple and yet highly effective programming cam disc indexing and latching mechanism is provided and by which the above-mentioned objectives are completely fulfilled. Also, it will be apparent to those skilled in the art that modifications and/or changes may be made in the disclosed embodiment illustrated and described above without departure from the inventive concepts manifested thereby. Accordingly, it is expressly intended that the foregoing description and appended drawings are illustrative of a preferred embodiment only, not limiting, and that the true spirit and scope of the present invention be determined by reference to the appended claims.

What is claimed is:

1. An indexing mechanism comprising:

a programming member having means for defining an outer traction surface and an inner track surface spaced from said outer traction surface, said inner track surface having notches formed therein and spaced to establish successive indexed positions;

a rotatable drive shaft supported on a first axis parallel to and spaced from said outer traction surface;

a latch member pivoted on said first axis;

a capstan supported from said latch member for swinging movement therewith about said first axis and for rotation on a second axis parallel to and spaced from said first axis and said outer traction surface;

bracket means movable with said latch member and capstan and defining a latch tab engageable with said inner track, said latch tab being positioned with respect to said inner track, said first axis and said capstan to maintain a pivotal position of said latch member on said first axis to hold said capstan in frictional engagement with said outer traction surface when said latch tab is engaged with said inner track and to space said capstan from said outer traction surface when said latch tab is engaged in one of said notches;

means to move said latch tab out of said notches by pivoting said latch member on said first axis to move said capstan into engagement with said outer traction surface; and means driveably coupling said capstan with said drive shaft.

2. The apparatus recited in claim 1 wherein said programming member is rotatable, wherein said outer traction surface is circular and including means to support said circular outer traction surface for rotation about a third axis spaced from and parallel to said first and second axes.

3. The apparatus recited in claim 1 wherein said bracket member is an arcuate arm concentric with said second axis.

4. The apparatus recited in claim 1 wherein said latch member includes means to bias said latch tab into engagement with said inner track and into said notches.

5. The apparatus recited in claim 4 wherein said biasing means comprises a resilient arcuate arm portion connected at one end to said latch member and having at its other end, a tab to engage said traction surface.

6. An indexible programming mechanism comprising:

a programming member supported for rotatable indexing movement on a first axis, said member having an outwardly facing circumferential traction surface, an inwardly facing axial track surface spaced radially from and concentric with said traction surface, and one or more indexing notches formed in said axial track;

a drive shaft rotatable on a second axis parallel to and spaced from said first axis by a distance greater than the radius of said traction surface;

a latch member having a hub portion pivotal on said second axis, a rigid arm portion extending radially from said hub portion and defining a third support axis parallel and spaced from said first and second axes, a bracket member extending rigidly from said hub portion and a follower tab supported by said bracket member to be spaced from said second axis; and a capstan supported for rotation on said third axis and driveably coupled with said drive shaft;

said latch tab being positioned to ride on said axial track surface and hold said capstan in driving engagement with said traction surface and to space said capstan out of engagement with said traction surface when said latch tab is located in said notches.

7. The apparatus recited in claim 6 including means to move said latch tab from said notches.

8. The apparatus recited in claim 7 including spring means to bias said latch tab against said axial track surface and into said notches.

9. The apparatus recited in claim 8 wherein said spring means comprises a yieldable arm extending from said hub portion to a bearing tab formation in engagement with said traction surface.

10. The apparatus recited in claim 9 wherein said bracket member, said arm portion and said yieldable arm are integral extensions of said hub portion.

11. The apparatus recited in claim 9 wherein said bracket member and said yieldable arm are of arcuate configuration and concentric with said third axis on diametrically opposite sides thereof.

12. The apparatus recited in claim 9 including a first gear keyed to said shaft and a second gear concentric with said capstan and in meshing engagement with said first gear to driveably couple said capstan with said drive shaft.

13. In an indexing mechanism, the improvement comprising:

a displaceably mounted programming member including a traction surface and a track surface having at least one notch disposed therealong, said traction surface and said track surface facing in opposite directions;

a latch member;

a capstan;

means for mounting said latch member and said capstan in fixed spaced apart relationship and for resiliently urging said latch member against said track surface, said latch member and said capstan being mounted such that, when said latch member is disposed out of said notch, said capstan is disposed in engagement with said traction surface and, when said latch member is disposed in said notch, said capstan is disposed out of engagement with said traction surface;

means for driving said capstan; and actuable means for selectively displacing said latch member out of said notch, said capstan being automatically displaced into engagement with said traction surface at such time to effect a displacement of said track surface relative to said latch member, said latch member subsequently automatically moving into said notch under the influence of said mounting and urging means when aligned with said notch and said actuable means is deactivated causing said capstan to again become disengaged from said traction surface terminating said relative displacement between said track surface and said latch member until such time as said actuable means is reactivated.

* * * * *